United States Patent [19]

Persem

[11] Patent Number: 4,765,150
[45] Date of Patent: Aug. 23, 1988

[54] CONTINUOUSLY VARIABLE CAPACITY REFRIGERATION SYSTEM

[75] Inventor: Jacob P. Persem, Tracy, Calif.

[73] Assignee: Margaux Controls, Inc., Fremont, Calif.

[21] Appl. No.: 12,578

[22] Filed: Feb. 9, 1987

[51] Int. Cl.$^4$ .............................................. F25B 1/00
[52] U.S. Cl. .................................... 62/215; 62/228.4; 417/45
[58] Field of Search .................... 62/228.4, 228.3, 215, 62/229, 226; 417/45, 22, 371

[56] References Cited

U.S. PATENT DOCUMENTS

| | | | |
|---|---|---|---|
| 3,610,781 | 10/1971 | Kolb | 417/319 |
| 4,507,058 | 3/1985 | Schoenmeyr | 417/271 X |
| 4,622,827 | 11/1986 | Jabami et al. | 62/228.4 |
| 4,628,700 | 12/1986 | Alsenz | 62/228.3 |
| 4,676,073 | 6/1987 | Lawrence | 62/228.3 X |

FOREIGN PATENT DOCUMENTS 2323269  3/1973  Fed. Rep. of Germany ...... 417/271

*Primary Examiner*—William E. Wayner
*Attorney, Agent, or Firm*—Flehr, Hohbach, Test, Albritton & Herbert

[57] ABSTRACT

A refrigeration compressor system using a reciprocating compressor with continuously variable capacity. The speed of the compressor can be varied substantially continuously over predefined range of speeds. A controller for the compressor monitors one or more physical parameters indicative of the temperature of the application being refrigerated, such as the temperature itself and/or the pressure in the compressor's refrigerant suction line. Using a predefined algorithm, the controller adjusts the speed of said compressor so as to keep said monitored parameter within a predefined target range. In a preferred embodiment, the compressor is an open direct drive compressor. The compressor's motor has a substantially continuous range of useable operating speeds which varies by a ratio of more than two to one. Furthermore, the controller has a plurality of control strategies for adjusting the speed of the compressor's motor, including one for adjusting the motor's speed in accordance with difference between the measured temperature and a specified target temperature, one for adjusting the motor's speed in accordance with difference between the pressure in the compressor's refrigerant suction line and a specified target temperature, and one for adjusting the motor's speed in accordance with both the temperature and suction pressure.

11 Claims, 5 Drawing Sheets

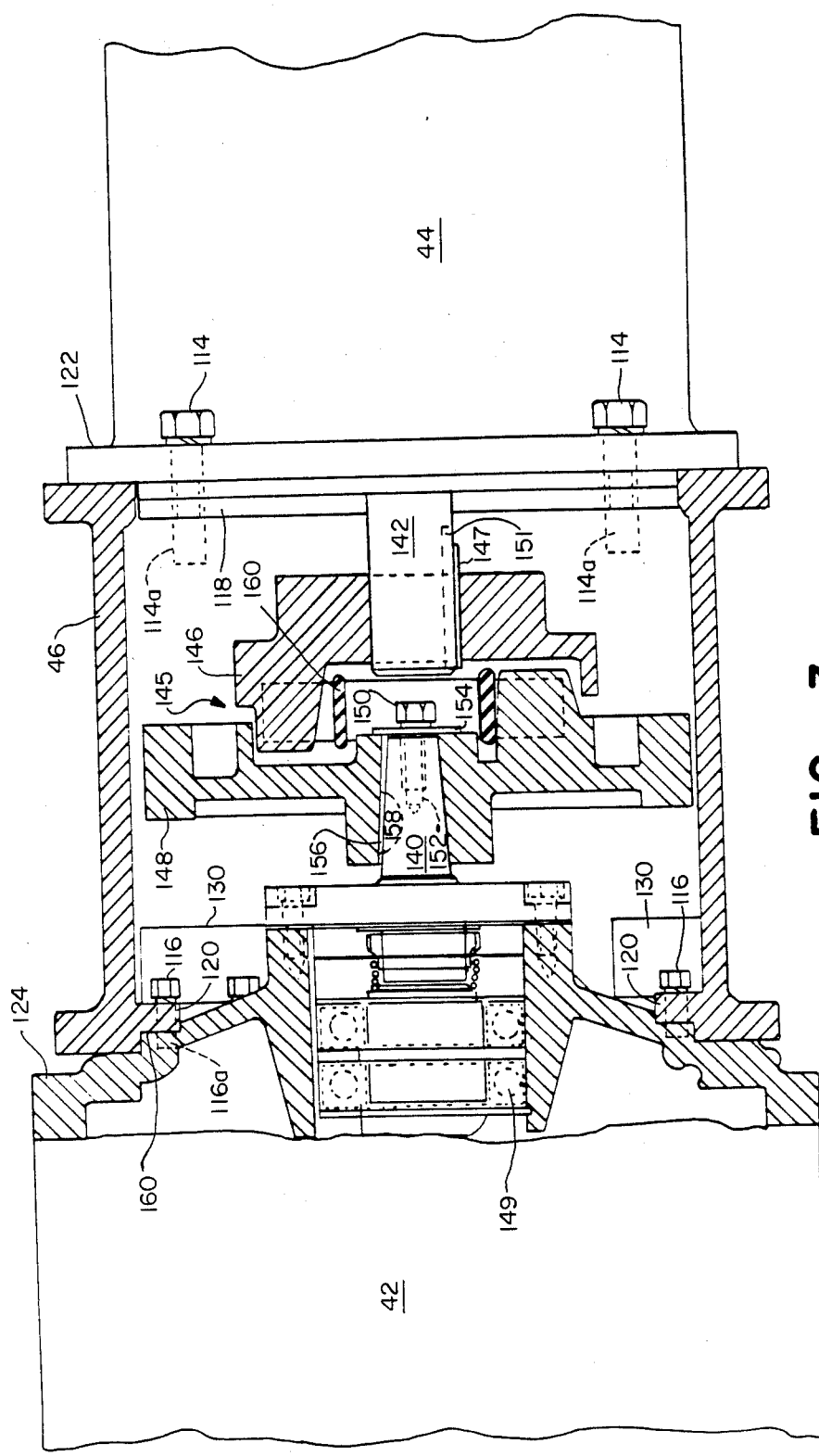

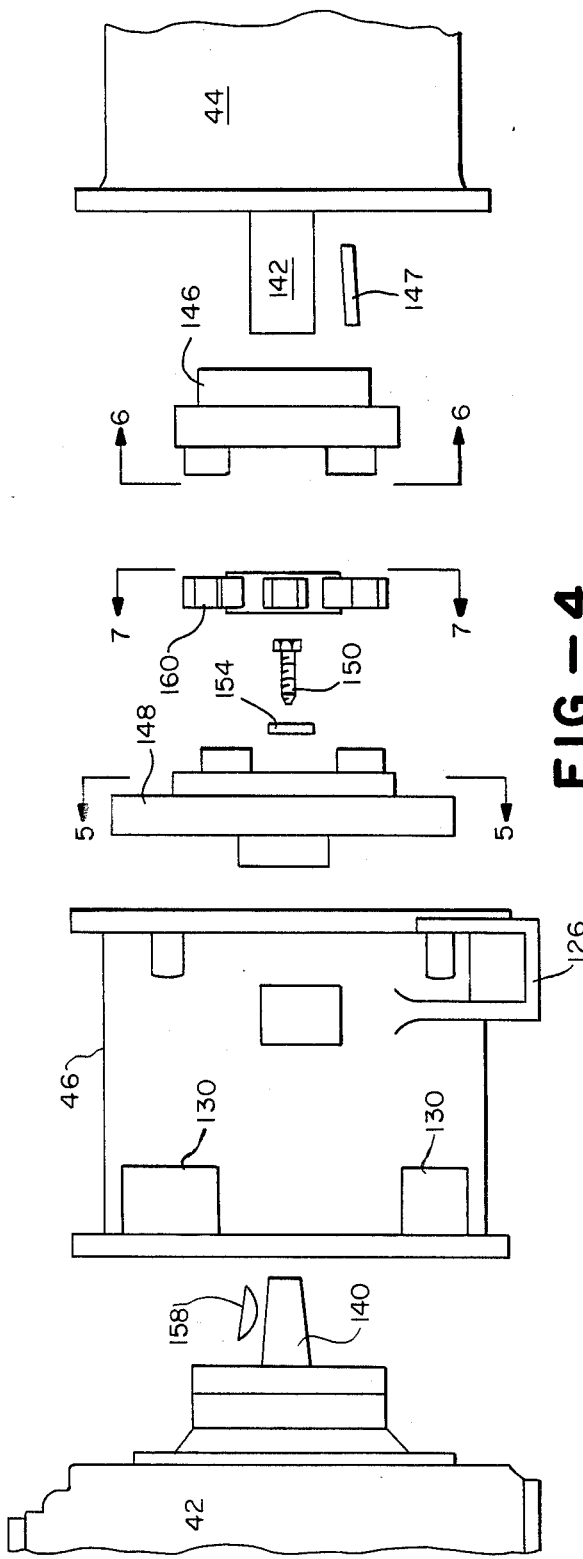
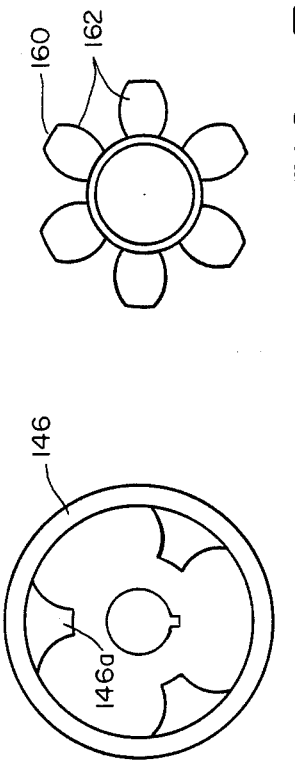
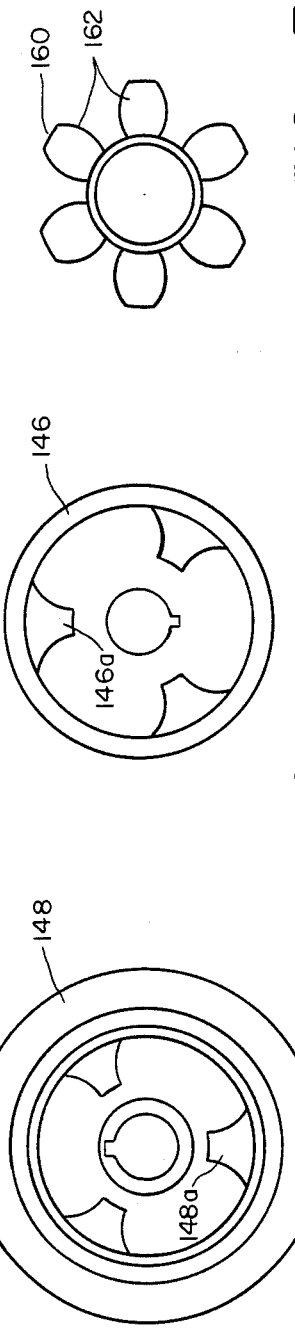

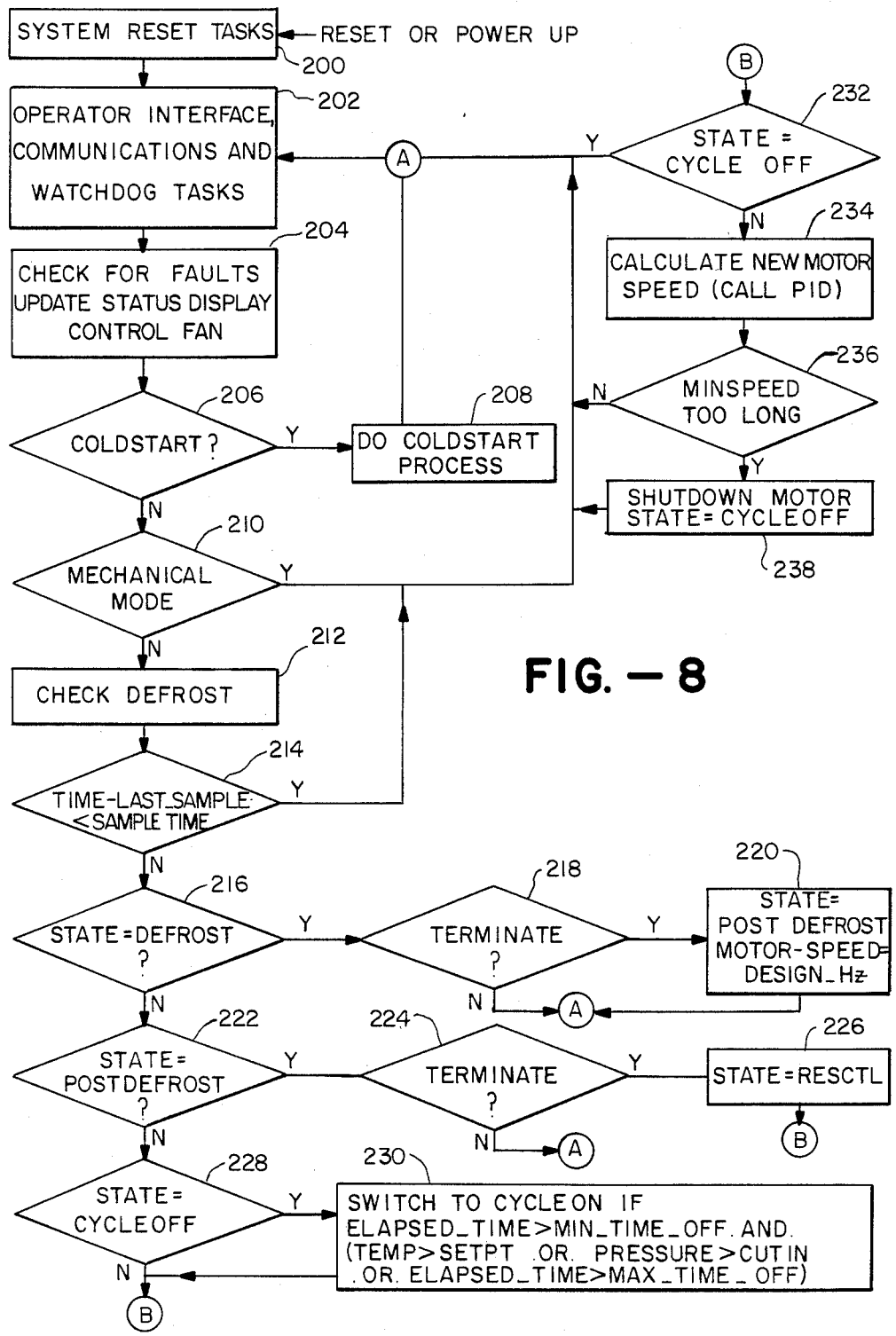
FIG. — 8

CONTINUOUSLY VARIABLE CAPACITY REFRIGERATION SYSTEM

The present invention relates generally to refrigeration systems, and particularly to a refrigeration compressor system with continuously variable capacity.

BACKGROUND OF THE INVENTION

About half the energy used in a modern supermarket is consumed by backroom refrigeration equipment, primarily compressors, condensers and related components. This equipment must be properly sized to provide enough refrigeration capacity to maintain the qualify of food in the refrigerated cases.

The difficulty in determining the proper size or capacity of a refrigeration system lies in the fact that the system cooling load changes dramatically depending on a number of unrelated factors: time of day, outside temperature and humidity, inside temperature and humidity, the manner in which the cases are stocked, the frequency and duration of use by customers, and so forth.

To account for this constantly changing load, refrigeration compressor systems currently used for supermarket product refrigeration have to be designed with enough capacity to function properly under the worst possible conditions—the hottest, most humid days of the year. Since worst case conditions occur on the average only about two percent of the time—six or seven days of the year—the prior art systems are inefficient about 98 percent of the time.

Evolution of Compressor System Design

There are three primary types of prior art refrigeration compressor systems: conventional (single compressor) systems, parallel (multiple equal compressor) systems, and dissimilar (multiple unequal compressor) systems.

Conventional Systems. The first compressor system widely used in supermarkets was the conventional, single compressor, system, in which a single compressor system is used for each "application" (i.e., case or set of connected cases with similar types of product therein) in the store. In these conventional systems, capacity control is very simple—the system is either turned on or off. This is acceptable with small compressors, but for larger compressors it is seldom satisfactory because of the fluctuations in controlled temperature.

Under light load conditions the conventional systems can suffer damage from compressor short cycling (i.e., turning on and off too frequently). Many stores reduce the low pressure cutout setting on these system to a point below the design limits of the system in order to prevent short cycling. As a result, the compressor may operate for long periods at extremely low evaporating temperatures. Operating the system at temperatures below those for which it was designed leads to overheating the motor compressor and to inadequate oil return to the compressor. These conditions can cause compressor damage and failure.

Other major disadvantages of conventional compressor systems are as follows. Because of their cyclic capacity control, conventional systems cannot maintain case temperature temperatures. Typically, the variance is 8° F.

Conventional systems cycle on and off frequently when the condensing temperature is low because the capacity of the system becomes very large compared to the load, and therefore conventional system are unable to take advantage of the low condensing temperatures at which operation would be the most efficient. The present invention can take advantage of low condensing temperatures—and thus be more efficient—because the system can reduce its capacity so that the system's capacity more closely matches the load.

Conventional system use semi-hermetic compressors which have high failure rates. Repairing a semi-hermetic compressor requires removing the unit from the store and returning it to the manufacturer or to a rebuilder.

Parallel Systems. The next major step in the evolution of refrigeration system design involved systems with two, three and four equal-sized compressors configured for either low or medium temperature applications. Whereas a typical store might require 18 to 25 conventional compressor units, it would require only six to eight two-compressor parallel systems, and only two four-compressor systems.

Parallel systems offered a modest increase in capacity control—three to five steps as compared to the two steps in conventional systems. Also, failure of any one of the compressors does not result in direct product loss unless the system is operating near worst case loading. Other advantages of these systems was that these systems can use compressor hot-gas defrost in place of the electric heat defrost used in convention systems, heat reclaiming is more cost efficient than in conventional systems, and parallel systems occupy less space than convention systems, making it possible to have smaller machine rooms.

Major disadvantages of the parallel systems include lower efficiency (due to the need to operate with the lowest common suction pressure in the joint suction manifold), oil distribution problems (caused by different compressor oil pumping rates, interconnected compressor crankcases and uneven oil return), higher installation and service costs caused by system complexity, and higher (typically five times higher) costs for replacing refrigerant lost via leakage and contamination.

Dissimilar Systems. In an attempt to improve the relatively poor energy efficiency of parallel systems, dissimilar systems with three or four binarily weighted compressors (i.e., with nominal capacity ratios of 1:2:4:8). The most common dissimilar systems have three compressors with eight capacity steps, as compared to five steps for a four compressor parallel system. A typical store that would require 18 to 25 conventional compressor systems and two four unit parallel systems (with a total of eight compressors) would typically be configures with five three unit dissimilar systems (with a total of 15 compressors).

Dissimilar systems have two primary advantages over parallel systems: the additional capacity steps permit better matching of compressor capacity to case heat load; and energy efficiency is better because fewer application pressures are multiplexed into a common suction pressure.

Compared to conventional systems, dissimilar systems offer some of the same advantages of parallel systems, namely hot gas defrost and somewhat lower heat reclaim costs.

However, to effectively use the extra capacity steps requires the addition of sophisticated, expensive controls. Also, like parallel systems, dissimilar systems: require complex oil distribution systems, have lower energy efficient ratios than conventional systems because of the multiplexing of suction pressures, and have higher installation and servicing costs than conventional systems due to the system's increased complexity. Also, even the best dissimilar system still suffer case temperature swings of 4° F.

In summary, despite their inherent weaknesses, conventional single compressor systems remain the most commonly used compressors in supermarkets largely because (1) conventional systems are dedicated to single applications, which makes it possible to more closely match the compressor size to its load than for other types of systems, (2) operating at a single suction pressure results in a higher energy efficiency ratio, and (3) conventional systems are less complex than parallel and dissimilar systems, and hence, easier to install and maintain.

How the Present Invention Differs from Prior Systems

The present invention is a compressor system with continuously variable capacity. This is achieved by using a direct drive motor with a wide range of operating speeds to drive a standard reciprocating compressor. A control system continually tracks the temperature in the application, and the pressure in the suction line, and determines the best motor speed to match the current load on the system. Since the motor speed is continuously variable, the system can adjust its heat load capacity to closely match the current load on the system.

The present invention has the primary characteristics of the ideal refrigeration capacity control system. First, it continuously adjusts to load. Second, full load efficiency is unaffected by the capacity control mechanism. Third, there is no loss of efficiency at partial loads. Fourth, there is no reduction in the reliability of the compressor caused by the capacity adjustment mechanism.

Since refrigeration compressors made in accordance with the present invention can reduce capacity to match reduced loads, these compressors are cycled off and on much less frequently than prior art compressors. By substantially reducing the frequency of stressful compressor restarts, and by virtually eliminating compressor slugging (i.e., drawing too much refrigerant when turning on), the present invention reduces maintenance costs.

Another important advantage of the present invention is that it can maintain case temperature within 1° F. of a specified setpoint. This compares to 8° F. swings for conventional systems, and 4° to 6° F. for dissimilar systems, thus holding out the promise of improved product quality and longer shelf life.

It should be noted that the present invention uses reciprocating (e.g., 2 or 4 piston) compressors, which are required in medium temperature (below 55° F.) and low temperature refrigeration (below 20° F.) systems. In the commercial refrigeration industry practically all of the compressors used are semi-hermetic compressors (i.e., reciprocating compressors with a motor mounted on the same drive shaft as the compressor, built together in a semi-hermetic housing).

Until the present invention, it has been generally assumed by the refrigeration industry that open direct drive compressors were too expensive and unreliable for commercial refrigeration. One of bases for this assumption has been that, in the prior art systems, alignment of the motor and compressor in open direct drive compressors was a difficult and expensive process. Minor misalignments caused seals to deteriorate, ultimately resulting in vibration and mechanical failure. The present invention solves this problem with a new bell housing that couples a motor to a compressor and ensures proper alignment.

It may also be noted that continuously varying the capacity of a prior art semi-hermetic compressor is generally not practical. The speed of semi-hermetic compressors cannot be varied significantly because, at speeds below the compressor's normal speed (e.g., 1750 rpms), the compressor will receive insufficient refrigerant mass flow to prevent motor burn out. Also, these compressors generally use forced gear oil pumps which are designed to provide sufficient lubrication only when the motor runs at a specified speed.

SUMMARY OF THE INVENTION

In summary, the present invention is a refrigeration compressor system using a reciprocating compressor with continuously variable capacity. The speed of the compressor can be varied substantially continuously over predefined range of speeds. A controller for the compressor monitors one or more physical parameters indicative of the temperature of the application being refrigerated, such as the temperature itself and/or the pressure in the compressor's refrigerant suction line. Using a predefined algorithm, the controller adjusts the speed of said compressor so as to keep said monitored parameter within a predefined target range.

In a preferred embodiment, the compressor is an open direct drive compressor. The compressor's motor has a substantially continuous range of useable operating speeds which varies by a ratio or more than two to one. If a temperature measurement for the application being refrigerated is available, the controller adjusts the motor's speed in accordance with difference between the temperature measurement and a specified target temperature. Otherwise, the controller adjusts the motor's speed in accordance with the pressure in the compressor's refrigerant suction line. In either case, the controller both integrates and differentiates an error value corresponding to the difference between the monitored measurement and a target value for that measurement. The controller then computes a speed adjustment value as a function of the error value, the integrated error value, and the differentiated error value, and adjusts the speed of the compressor in accordance this computed speed adjustment value.

The controller further includes software for turning off the compressor during defrost, for switching the system to a mechanical mode when certain faults are detected, and for cycling the compressor off and on when the capacity of the compressor exceeds the load on the application even when the compressor is running at its minimum speed.

BRIEF DESCRIPTION OF THE DRAWINGS

Additional objects and features of the invention will be more readily apparent from the following detailed description and appended claims when taken in conjunction with the drawings, in which:

FIGS. 2-7 show how the compressor is coupled to its motor in the preferred embodiment.

FIG. 8 is a flow chart of the main control program used in the preferred embodiment.

DESCRIPTION OF THE PREFERRED EMBODIMENT

Figure 1:
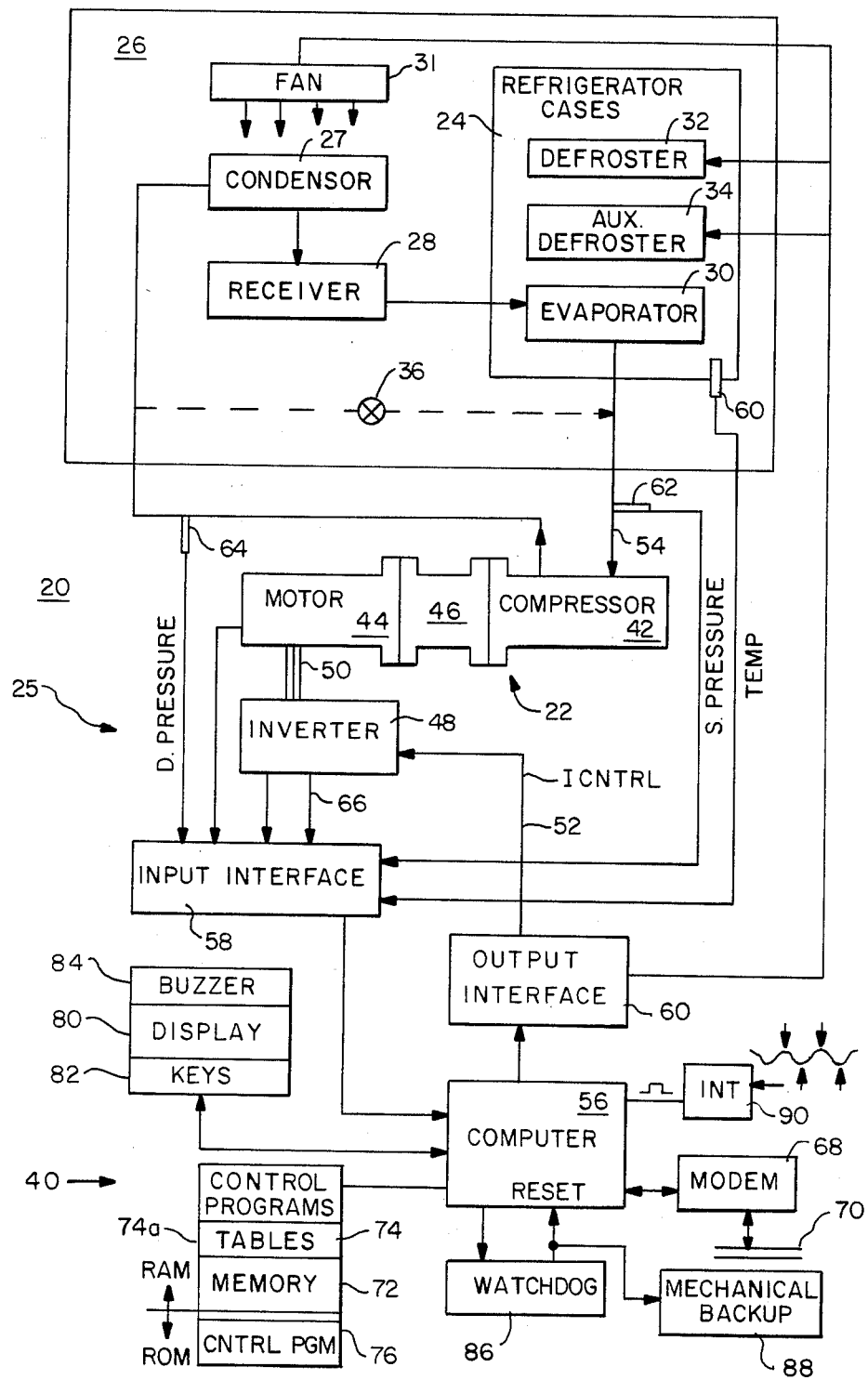
FIG. 1 is a block diagram of a refrigeration system incorporating the compressor system of the present invention.

Referring to FIG. 1, there is shown a block diagram of a refrigeration system 20 with a continuously variable capacity compressor 22. The refrigeration system 20 is typically used to refrigerate one or more cases 24 in a supermarket.

The present invention concerns the compressor system 25, including the compressor 22 and its control mechanisms. In the context of the present invention, it is assumed that the refrigeration system 20 includes all the standard elements 26 of a standard commercial refrigeration system including a condenser 26, receiver 28, an evaporator 30, and a defrost mechanism. In most systems, the condenser 26 is air cooled by air from a fan 31.

If the refrigeration system does not use hot gas defrost, the refrigeration system will include a primary defroster 32, such as an electric coil defroster. If the system 20 includes more than one refrigeration case, there may be an auxiliary defroster 34 for defrosting cases which need to be defrosted more frequently than the other cases. If the system 20 does use hot gas defrost, it will typically have a hot gas valve 36 for routing hot refrigerant exiting the compressor 22 through the evaporator 30. In the preferred embodiment, the controller's defrost control software is tailored to fit the type of defrost being used.

The compressor 22 includes a reciprocating compressor 42 coupled to a variable speed drive motor 44 by an open direct drive arrangement 46 which is described in more detail below with reference to FIGS. 2–7.

Inverter. The drive motor 44 can be driven at any specified speed within a predefined range, such as 450 to 1800 rpms, by an inverter 48. The inverter 48 drives the motor 44 by converting a standard three phase power source into a three phase power source 50 which oscillates at a specified frequency. The inverter's output frequency is specified by a control signal on line 52. In the preferred embodiment, the control signal is a current signal in which the specified frequency, FHZ, is equal to (Icntrl−4)*60/16, where Icntrl is the control signal's current measured in milliamps.

The inverter 48 is programmed to monitor the current and voltage waveforms on the drive line 50, and to adjust the drive voltage until the power delivered to the motor matches its load. In addition, the inverter 48 generates two feedback signals: a motor speed feedback signal which indicates the actual speed of the motor 44 (which may be different from the specified speed because of slippage or other problems) and an inverter fault signal which becomes active only if the inverter suffers a serious fault.

Typically, the motor will turn at a specified multiple (e.g., thirty) of the power source frequency. In the preferred embodiment, an inverter frequency of fifteen hertz corresponds to a motor speed of 450 rpms, and an inverter frequency of 60 hertz corresponds to a motor speed of 1800 rpms. Thus, for all practical purposes, the control signal Icntrl on line 52 specifies a motor speed:

Specified motor speed = $MX*(Icntrl-4)*60/16$ where MX is the speed/frequency conversion factor.

The inverters used in the preferred embodiments to power the motor are Yaskawa 200 series inverters (which accept three phase input power at 185 to 280 volts and 50 or 60 cycles per second, and Yaskawa 400 series inverters (which accept three phase input power at 295 to 595 volts and 50 or 60 cycles per second). The control software in the inverters has been modified to adjust the drive voltage as described above.

Controller. The compressor's controller 40 is a computerized controller which monitor's the temperature in the application (typically refrigeration cases) 24 and/or the suction pressure in the compressor's suction line 54, and adjusts the speed of the motor 44 in accordance with the difference between the temperature or pressure and a specified target value.

The core of the controller 40 is a small computer 56, using a microprocessor (e.g., the INTEL 8088) for its central processing unit. The computer 56 receives input signals indicative of the state of the system 20 from its input interface 58. Outputs from the computer 56, which control the defrosters 32 and 34, the condenser fan 31, and the motor speed, are routed through and buffered by an output interface 60.

The input interface 58 includes a standard eight bit analog to digital converter (not shown) which converts analog measurement signals into corresponding digital values. The analog inputs include: a temperature signal from temperature probe 60 which is converted into a digital value called measured.temp: a suction pressure signal from pressure gauge 62, which is converted into a digital value called suction.pressure; a discharge pressure signal from pressure gauge 64 which is converted into a digital value called discharge.pressure; and a motor speed feedback signal on line 66 from the inverter 48 which is converted into a digital value called motor.speed.

The input interface 66 also receives two logical signals: a fault signal from the inverter 48, and a signal indicating a low oil condition in the compressor apparatus 22.

The computer 56 is coupled to a modem 68 so that status information can be sent to remote locations by telephone line 70. In the preferred embodiment, a new table of operating parameter values can be downloaded from a remote computer through the modem 68, and if necessary, a complete new set of control programs can be downloaded into the system's memory 72.

The system's memory 72 includes battery backed up static RAM 74 (random access memory), and also ROM 76 (read only memory). The system's control software is stored in the ROM 76, but new versions can downloaded and stored in the RAM 74. If the RAM version is lost or corrupted (e.g., fails a checksum test), the version in the ROM can be used until a new copy of the current version is downloaded through the modem 68. The RAM 74 is also used to store a table 74a of operating parameters, which define how the controller 40 is to work with the particular application 26 connected to the controller 40.

The preferred embodiment uses a backlight eight line LCD display 80 to display the system's status, and to display the current function of the keys 82 at the bottom of the display. Using these keys, the user can flip through a series of different control and status menus and displays to review the status of the system 20, and to change parameter values in the parameter tables 74a. The controller 40 also uses a buzzer 84 to denote the occurrence of problems which require immediate attention.

A watchdog circuit 86 monitor's activity on one of the computer's ports. If no activity is detected in a predefined period of time (typically 0.5 seconds), the watchdog circuit 86 generates signals which reset the computer 56, and which activate the system's mechanical backup circuitry 88.

As in virtually all mechanical backup systems for commercial refrigeration, the mechanical backup circuitry 88 ensures that the compressor motor continues to run even if the controller 40 fails, so that the product in the refrigeration cases 24 will be preserved while the controller is being repaired.

The control method used in the preferred embodiment will be described after the description of the compressor-motor coupling.

Compressor-Motor Coupling

Figure 2:
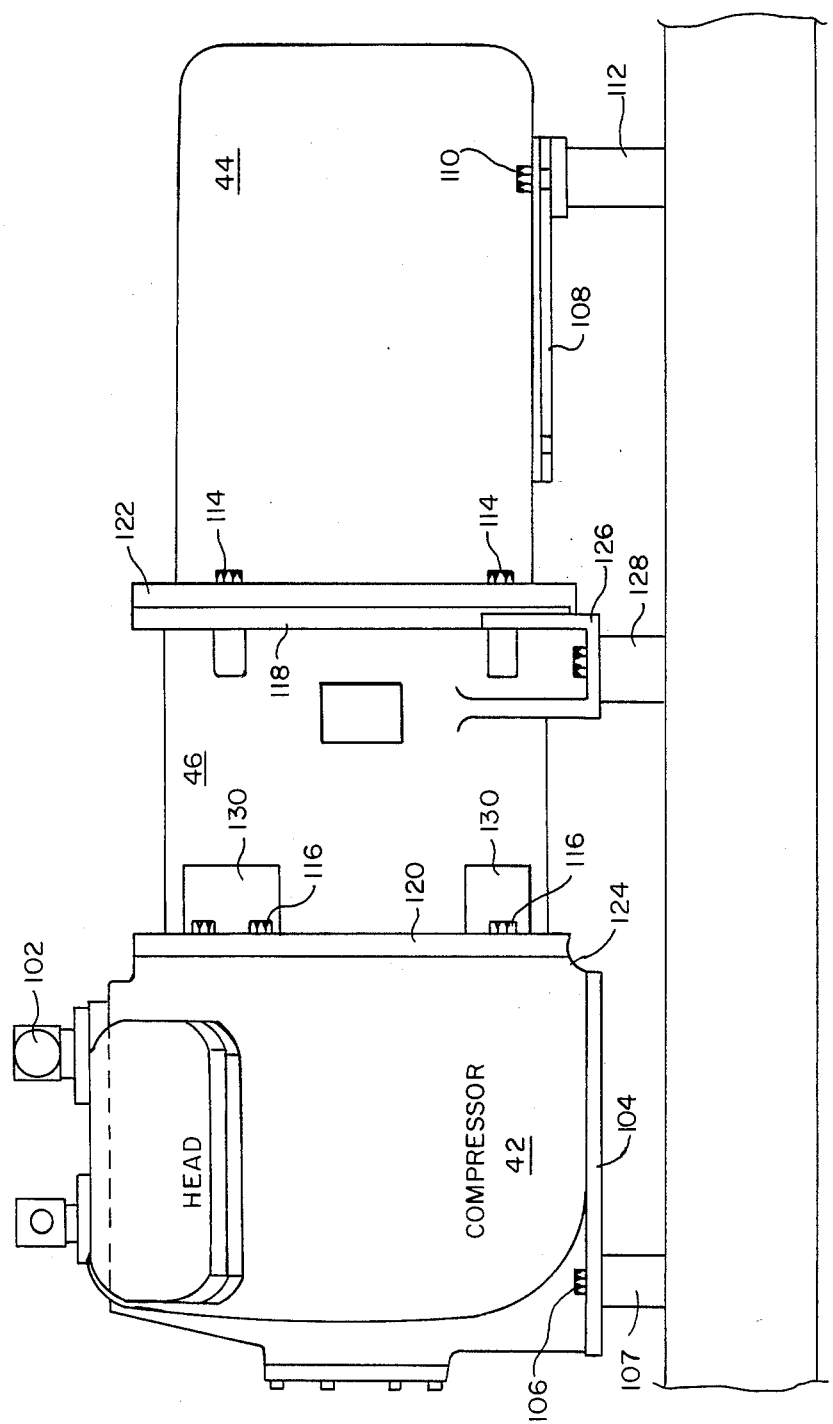

Referring to FIG. 2 there is shown a plan view of a compressor 42, a drive motor 44, and the coupling sleeve 46 therebetween. The compressor 42 is a reciprocating open drive compressor. In two preferred embodiments, the compressor has two cylinders and four cylinders. Gas entering the compressor at inlet 102 can range from −127° F. to 85° F.

The motor 44 is a standard NEMA D-flang motor. The motors used in the preferred embodiments include motors made Baldor (models 36F563W932 (5 horsepower), 37E778X118 (7.5 hp), and 37E778X234 (10 hp)), and similar capacity motors made by Marathon.

As shown in FIG. 2, the compressor's housing has a mounting base 104 through which two bolts 106 (one on each side of the compressor) can be inserted for supporting the compressor on platform 107 at a fixed location. The motor 44 also has a mounting base 108 through which bolts 110 can be inserted for supporting the motor 44 on a platform 112.

The coupling sleeve 46, also called a bell housing, is disengageably connected to both the compressor 42 and the motor 44 by bolts 114 and 116 which couple the flanges 118 and 120 on each end of the sleeve to corresponding flanges 122 and 124 on the motor and compressor. The sleeve 46 has a cylindrical interior, and two feet 126 (one on each side of the assembly) which can be bolted to a platform 128. While the sleeve is mostly closed to prevent extraneous objects from entering the sleeve, the sleeve has apertures 130 through which a socket wrench can be inserted for tightening and loosing the bolts 116 which connect the sleeve 46 to the compressor 42.

Referring to FIG. 3, there is shown a cross section of the compressor 42, motor 44 and coupling sleeve 46. The compressor's input shaft 140 and the drive motor's drive shaft 142 are connected by a coupling arrangement 145 including two coupling members 146 and 148. The manner in which these two coupling members interlock will be discussed below with reference to FIGS. 4 through 7.

The first coupling member 146 is carried by the drive shaft 142 of the motor, and the second coupling member 148 is carried by the input shaft 140 of the compressor. These coupling members are interlocked in an unconnected manner with one another so that the output shaft 142 of the motor 44 drives the input shaft 140 of the compressor 42.

The coupling member 146 on the motor shaft 142 is a standard, motor coupling which clamps onto the motor shaft using a locked bolt bushing. The shaft 152 and coupling member 146 have at least one corresponding straight key 147 and key slot 151 for transferring torque from the drive shaft 142 to the motor coupling 146.

The coupling member 148 connected to the compressor shaft 140 is a single piece of casted aluminum in the form of a flywheel which acts not only as a coupling member, but also acts as a flywheel which absorbs inertia from the compressor, reduces vibrations in the compressor, and reduces the stress placed on the compressors bearing's 149 by changing loads and motor speeds. The flywheel 148 is coupled to the compressor's tapered shaft 140 by a single standard SAE threaded bolt 150 which threads into a threaded hole 152 in the shaft. The bolt 150 holds a washer 154 against the flywheel 148, thereby securing the flywheel to the compressor shaft. The flywheel also has a slot 156 that slides over a woodruff key 158 for transferring torque from the flywheel 148 to the input shaft 140. Furthermore, each flywheel 148 is balanced on a lathe to match the compressor that it being used with.

The sleeve 46 is connected to the motor 44 by a set of four bolts 114 which go through a standard D flange 122 in the motor's housing into corresponding bosses 114a in the sleeve's flange 118. On the compressor side, the sleeve sits on a locating shoulder 160 machined into the compressor's housing, and is held in place by a set of bolts 116 which go through a flange 120 on the inside of the sleeve 46 into corresponding bosses 116a in the compressor's housing. Access to these bolts 116 is provided by apertures 130 shown in FIG. 2.

The sleeve 46 is made of aluminum and is strong enough to support the motor 44 in a fixed position relative to the compressor for maintaining the drive shaft 142 of the motor in alignment with the input shaft 140 of the compressor when the coupling members 146 and 148 are interlocked with one another.

Although the weight of the motor is partially supported at one end by platform 112, the sleeve 46 is the sole means for supporting the motor so as to maintain the shafts in alignment with one another. Alignment of the two shafts takes place simply by bolting the sleeve to the compressor and motor with the flywheel and motor coupling assembly 145 inside. The sleeve bolts themselves assure proper alignment.

FIG. 4 shows the components of the coupling arrangement separated from one another along the center axis of the shafts 140 and 142. This Figure also shows the placement of the cut away views in FIGS. 5 through 7.

Referring to FIGS. 5 and 6, both coupling members 148 and 146 have three spaced apart lugs 148a and 146a which interlock with the lugs on the other coupling member. When assembled, the lugs on the interlocking coupling members are separated by a nonmetallic, compressible webbing 160 (shown in FIG. 7), made from a standard chloroprene compound used in webbed motor couplings, which prevents direct metal to metal contact by the lugs, and absorbs shocks and transient torque imbalances. The webbing 160 has six teeth 162 which fit snugly between the lugs on both couplings.

Control Software

FIG. 8 is a flow chart of the control software used in the preferred embodiment. Appendix 1 at the end of this description contains a pseudocode representation of the main routine used in the preferred embodiment, and shows more details of the process than shown in FIG. 8. Appendices 2–8 at the end of this description contain pseudocode representations of the software subroutines relevant to the present invention.

The pseudocode used in these appendices is, essentially, a computer language using universal computer language conventions. While the pseudocode employed here has been invented solely for the purposes of this description, it is designed to be easily understandable to any computer programmer skilled in the art. The computer programs in the preferred embodiment are written in the "C" computer language, and in the assembly language for the (Intel model 8088) microprocessor used therein.

The following are some notes on the syntax of this pseudocode:

Comments. Comments, i.e., nonexecutable statements, begin with "–". All text on the rest of that line, after a "–", is a comment.

Multiline Statements. Statements continue from line to line as needed.

If Statement. There are two versions. For the one statement version the syntax is:

If —condition——statement—.

For the block statement version the syntax is:

| If -condition- | |
|---|---|
| -block of statements- | |
| Else | optional |
| -block statements- | optional |
| Endif | |

Main Routine. Referring to FIG. 8 and Appendix 1, when the system is first powered up or reset (box 200) the computer performs the usual self diagnostic tests. It also checks to see if an updated version of the control software has been loaded into the RAM 74, and uses that version if the RAM passes a standard checksum test. When the watchdog circuit resets the system, if generates signals which (1) put the system in "mechanical" mode, in which the mechanical backup system keeps the motor running, and (2) reset the controller's computer 56. If the controller 40 successfully resets itself, it puts the system back into "automatic" mode—in which the system's controller is in charge of the motor's speed.

Once the controller is reset, the controller continually performs the main loop of the control software, shown as starting at node A in FIG. 8. In the preferred embodiment, the execution time of the main loop varies between 0.25 and 1.5 seconds, depending on the tasks performed.

The initial tasks (box 202), which are not relevant to the present invention, include handling keystrokes entered by the operator, updating the display, responding to communications from a host computer (i.e., communications tasks), and signalling the watchdog circuit 86 that the controller 40 is operational. Then the controller executes the compressor motor control software, starting at box 204.

User Specified Parameters. Referring to Table 1, each refrigeration system 26 may have somewhat different equipment or operating conditions. To tailor the controller to each application, the user specifies the set of parameters shown in Table 1. While these parameters will be discussed as they are used, some affect the overall operation of the controller.

The parameter called "Temp.Enabled" indicates whether a temperature measurement is available for use by the controller. Since it is the goal of the controller to maintain a target temperature (called Setpt.Temp) in the application, it is clearly preferred that the system include a temperature sensor 60.

Another important parameter is called UsePressure. As will be described with reference to Appendices 5 and 8, if Temp.Enabled is false or if UsePressure is true, the controller will control the speed of the compressor's motor using an algorithm based on the pressure in the compressor's suction line. Otherwise, it will use an algorithm based on the temperature in the application. However, if both Temp.Enabled and UsePressure are true, the controller will use an algorithm that is primarily based on the suction pressure, but which floats the target pressure in accordance with the temperature in the application. Thus the controller has three different control strategies which it can use.

Analog Input Interrupt Routine. Referring back to FIG. 1, the controller 40 includes an interrupt generator 90 which generates an interrupt signal 120 times per second, at the peaks and valleys of the waveform of the system's 60 hertz power supply. Each interrupt signal causes the system to run the analog signal input routine shown in Appendix 4.

In summary, the analog signal input routine reads in, and keeps running averages of the temperature, suction pressure, discharge pressure, and motor speed feedback signals. These signals are converted into digital signals by the input interface 58. The analog input routine includes a schedule which controls which input signal is to be sampled and converted by the analog to digital converter in the interface 58 during each interrupt period.

In each cycle of sixteen interrupt calls, it averages the value of each input signal measured at the time of a power waveform peak and at the time of a power waveform valley. It then computes a running average for each signal to reduce the effect of transient signal fluctuations.

In the preferred embodiment, temperature is measured to an accuracy of 0.25° F., and pressure is measured to an accuracy of 0.5 psi (pounds per square inch).

The analog input routine also acts as a timer routine which updates the "elapsed time" timer. This elapsed timer is used throughout the control program for various time checks.

Fault Check. The motor control software starts (at box 204) by checking for serious faults. The fault checking routine, shown in Appendix 2, checks for the following faults: (1) is the discharge pressure above a specified limit "discharge.max, (2) is the suction pressure below a specified value "suction.min", (3) is the measured temperature above or below specified limits "case.temp.max" and "cause.temp.min", (4) is the motor speed feedback signal more than fifteen percent off from the specified speed, (5) is the motor oil fault signal active, and (6) is the inverter fault signal active.

If any of these fault conditions occurs, the error is logged in the system's memory 72, noted on the display 80, and the system switches to mechanical mode—so that the mechanical backup system will take over control of the system.

After checking for faults, the display is updated so that any problems detected will be shown on the display. Serious faults are also denoted by activating the buzzer 84.

Condenser Fan Control. If the system is still in automatic mode, the condenser fan 31 is turned on if the discharge pressure is above FanCutIn, and is turned off if the discharge pressure is below FanCutOut. This sample fan control method saves a significant amount of energy in most air cooled systems when compared to the prior art.

Coldstart. Next (box 206), the control program checks to see if the system has recently been restarted. If so, the controller's mode will be "automatic" and the controller's state will be "COLDSTART". The COLDSTART process (box 208) is shown in Appendix 6.

The Coldstart process has three phases, First (after waiting for a defrost cycle to end, if necessary) the motor is turned on at a specified speed, CycleOn, which is typically an intermediate speed such as 750 rpms. Then, after a minute or so the controller checks that the motor speed is ramping up to the specified speed. If at the end of a specified time the motor is not within a specified margin of the CycleOn speed, the motor is shut off and the controller activates the mechanical backup system.

If this first test is passed, then the controller waits for another short period of time, tests to see if the temperature, suction pressure and discharge pressure have moved in right direction since the beginning of the Coldstart process, and returns control to the normal control routine.

At this point the controller checks to make sure that is still in automatic mode (box 210). If not, the control process goes back to node A.

Check Defrost Schedule. (box 212) The user can schedule up to six different times at which to start a primary defrost, and up to six other times at which to start the auxiliary defrost. The Check_Defrost routine, shown in Appendix 3, checks these schedules. If the current time corresponds to the scheduled start of a primary defrost, the primary defrost is turned on, the compressor motor is turned off, the controller's state is set to DEFROST, and the auxiliary defrost is also turned on if there is an auxiliary defrost.

Scheduled auxiliary defrosts are different in that only the auxiliary defrost is turned on and the controller does not change operating states. Also, since auxiliary defrosts run for a specified time, this routine also turns off the auxiliary defrost at the scheduled termination time.

Sample Time. The motor speed is adjusted only at specified intervals (box 214). If the time since the last execution of the motor speed adjustment process is less than SampleTime seconds, the process goes back to node A. The sample time interval depends on the control strategy being used. For temperature based control, the interval is typically fifteen to thirty seconds; for pressure based control, the sample time interval is typically three to ten seconds.

Defrost Termination. If the controller is in the DEFROST state (box 216), the controller checks to see if any of the defrost termination criteria have been met (box 218). There are three different criteria which can be used: a maximum defrost duration, a maximum suction line pressure, and a maximum case temperature. If defrost is not terminated, the motor is left off and the process goes back to node A.

If defrost is terminated, the controller turns on the motor at full speed (called Design_hz), sets its state to POSTDEFROST (box 220) and returns to node A. The purpose of POSTDEFROST is to pull the application temperature back down to normal as quickly as possible.

PostDefrost. The controller remains in POSTDEFROST for at least a specified minimum time, Min. PostDefrost_Time. Then POSTDEFROST is terminated, and the controller's state is set to RESCTL (short for "restore control"), if (1) the temperature falls below a specified temperature above the target temperature; (2) the suction pressure falls below a specified suction pressure above the target suction pressure, (3) or the elapsed time is POSTDEFROST exceeds a specified time. Otherwise, the controller stays in POSTDEFROST with the motor running at full speed. POSTDEFROST is terminated before the temperature and/or pressure reach their target values so that the system will smoothly reach its target rather than overshooting the target temperature and/or pressure.

CycleOff Termination. If the compressor's capacity exceeds the load even when running at its minumum speed, the controller will shut down the motor and set the state to CYCLEOFF (see boxes 236 and 238). Once the motor is shut off, it is kept off for at least a specified time, Min.Time.Off, to prevent the compressor from being cycled off and on too quickly. Then controller will turn the motor back at a specified speed, CycleOn, and set the state to CYCLEON if (boxes 228 to 230): the temperature rises above its target level, the suction pressure rises above its target level, or the elapsed time in CYCLEOFF exceeds a specified maximum, Max. Time.Off.

If CYCLEOFF is not terminated (box 232) the controller leaves the motor off and goes back to node A. However, if the controller does go to CYCLEON, the normal procedure for adjusting the motor speed is used (box 234).

Adjusting Motor Speed. If the motor is not off, or running at a fixed speed (e.g., in POSTDEFROST), the motor speed adjustment procedure (box 234), called PID and shown in detail in Appendices 5 and 8, is executed. This procedure is called PID because the motor speed adjustment is based on three factors, one which is Proportional to an error signal, one which is the Integral of the error signal, and one which is the derivative of the error signal.

If temperature measurements are not enabled, or if the UsePressure flag is set, then the error signal used is the difference between the measured suction pressure and the pressure set point Setpt.Sp. Otherwise the error signal used is the difference between the measured temperature and the temperature set point Setpt.Temp.

In either case, the error signal is numerically integrated and differentiated and a speed adjustment is calculated:

$$err = Kp*((Kd*d\Delta S/dt) + (Ki \int \Delta S\, dt) + \Delta S)$$

$$speed\_change = err*range\_hz\_max$$

$$new\ motor\ speed = previous\ motor\ speed + speed\_change$$

where ΔS is the difference between the measured temperature or pressure and its corresponding target value. Kp, Kd and Ki are constant parmeters. One set of parameter values is used for temperature based control, and another is used for pressure based controol. dΔS/dt is the rate of change in the error signal ΔS, and "∫ΔS dt" is the integral of ΔS over a specified period of time. Range.hz.max is the multiple used to convert the computed PID error to a speed adjustment.

In the preferred embodiment there are acutually three control strategies: a temperature based strategy, a pressure based strategy, and one which uses both temperature and pressure. The third strategy comes into play if both Temp_Enabled and UsePressure are true. In this strategy, the pressure control algorithm is used, but the target pressure is periodically (typically once every few minutes) increased if the measured temperature is below the target deadband, and decreased if the measured temperature is above the target deadband. The pseudocode for this process is shown in Appendix 8.

In the preferred embodiment, the motor speed is not changed if the error signal falls within a specified target deadband—on the basis that if the system is on target, it should be left alone as long as possible.

Also, the new motor speed is (1) not allowed to increase at more than a specified rate nor to decrease at more than a specified rate—to prevent unnecessary motor speed fluctuations, and (2) is kept within its specified limits, MinSpeed and Design_hz.

To prevent the motor from by cycled on and off too often, the controller uses additional logic when the motor runs at its specified minimum speed (e.g. 450 rpms). The controller keeps the motor running at this minimum speed as long as the temperature or pressure remains within a specified deadband. But is the pressure falls below a specified low limit, or if the temperature and pressure fall below the deadband for at least a specified period of time (Min_Speed_Time, e.g., 10 minutes) the controller will turn off the compressor and enter the CYCLEOFF state.

The procedure for cycling the compressor back on is discussed above with reference to boxes 228 and 230.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

| PARAMETERS SPECIFIED BY USER | |
|---|---|
| PARAMETER | DESCRIPTION |
| Temp/Pressure Control | |
| Temp_Enabled | Flag - specifies if controller can use temperature measurements |
| UsePressure | Flag - use pressure to control motor speed |
| Sample_Time | Time between motor speed adjustments: typically 30 seconds for temperature cntrl 5 seconds for pressure control |
| Delta_TF | Time between adjustments of target suction pressure |
| Set Points | |
| Setpt_Temp | Target Temperature |
| Setpt_Sp | Target suction pressure |
| Suction Pressure | |
| Delta_High | Pressure above setpt at which motor if forced to run at its maximum spped |
| Delta_Cutin | Pressure above setpt at which system turns motor back on |
| Delta_Cutout | Pressure below setpt at which motor is forced to run at minimum speed |
| Delta_Low | Pressure below setpt at which motor will be shut off |
| Suction_Min | Fault limit |
| Discharge Pressure | |
| Discharge_Max | Fault limit |
| FanCutIn | Condenser pressure at which fan is turned on |
| FanCutOut | Condenser pressure at which fan is turned off |

TABLE 1-continued

| PARAMETERS SPECIFIED BY USER | |
|---|---|
| PARAMETER | DESCRIPTION |
| Motor Speeds | |
| Design_Hz | Maximum motor speed |
| Cycleon_Speed | Motor speed when system cycles on |
| Min_Speed | Minimum motor speed |
| Slowdown_Rate | Normal maximum rate at which motor speed can be decreased |
| Speedup_Rate | Normal maximum rate at which motor speed can be increased |
| Defrost | |
| P_Defrost_Starttime (6) | Primary Defrost start times |
| A_Defrost_Starttime (6) | Auxiliary Defrost start times |
| Termination_Pressure | Suction pressure limit for Primary defrost (typically 60 to 80 lbs) |
| Termination_Temperature | Case temperature limit |
| Defrost_Max_Duration | Maximum length of primary defrost |
| Aux_Defrost_Duration | Duration of auxiliary defrost |
| Postdefrost | |
| Min_PostDefrost_Time | Minimum duration of post defrost |
| Max_PostDefrost_Time | Maximum duration of post defrost |
| Delta_PullDown_T | Terminate Postdefrost if temp = Setpt + Delta_Pulldown_T |
| Delta_PullDown_P | Terminate Postdefrost if pressure = Setpt + Delta_Pulldown_P |
| CycleOff | |
| Min_Time_Off | Minimum time that motor is kept off once it is turned off |
| Max_Time_Off | Maximum time that motor is kept off during CYCLEOFF |
| Cycle_Temp_Delta | Terminate CycleOff if temp = Setpt + Cycle_Temp_Delta |
| Alarm Limits | |
| discharge_max | Maximum discharge pressure |
| hp_max | Duration of maximum discharge pressure before alarm |
| suction_min | Minimum suction pressure |
| sp_max | Duration of minimum suction pressure before alarm |
| ms_max | Duration of motor speed error before alarm |
| Case_Temp_Max | Maximum case temperature |
| Case_Temp_Min | Minimum case temperature |
| temp_cnt_max | Duraton of case temp error before alarm |
| PID - Motor Speed | |
| temp_range | Temperature divisor in control equations |
| Sp_Range | Pressure divisor in control equations |
| Kp, Kd, Ki | PID coefficients |
| range_hz_max | Multiple for motor speed adjustments |
| Deadband_T | Temperature deadband in which motor speed is not changed |
| Deadband_P | Pressure deadband in which motor speed is not changed |
| MinSpeed | |
| Min_Speed_Time | Maximum time motor is kept at min_speed before turn off unless suction pressure is too low |
| Coldstart | |
| Rampup | Duration of rampup before checking to see if system is responding - typically 2 minutes |
| Max_Speed_Dif | Maximum tolerable motor speed error |
| Rampup2 | Duration that system is checked for reasonable response (typically 3 minutes) |
| Min_Tchange | Minimum required temperature response |
| Min_Pchange | Minimum required suction pressure response |
| Min_Dchange | Minimum required discharge pressure response |

APPENDIX 1

PSEUDOCODE FOR MAIN ROUTINE

```
RESET:
Call Sys_Reset            -- Called at power up, or when
                          -- system is reset by watchdog.
                          -- Sets mode = AUTOMATIC and
                          -- state = COLDSTART MAIN_LOOP:
Call Interface            -- Performs operator interface,
                          -- communications, and watchdog
                          -- tasks Call Check_Alarm          -- See Appendix 2
                          -- sets relevant alarm flags and
                          -- puts system in Mechanical mode
                          -- if a serious fault is detected Update Display of System Status -- Condenser Fan Control
If mode = AUTOMATIC
      If discharge_pressure > FanCutIn    turn on  fan
      If discharge_pressure < FanCutOut   turn off fan
Else
      turn on fan         -- in mechanical mode, make sure
Endif                     -- the condenser fan is always on --   If system was in MECHANICAL (i.e., mechanical backup)
--   mode and the user restarts the controller, the
--   dislay/keypad handler will set mode=AUTOMATIC and
--   state=COLDSTART so that the Coldstart Routine will
--   be used to ramp up the system
If mode=AUTOMATIC .AND. state=COLDSTART
      Call Coldstart                      -- see Appendix 6
      GoTo MAIN_LOOP
```

```
Endif

If mode = MECHANICAL                    -- in Mechanical mode
    elapsed_time = 0
    sstate = 0                          -- prepare for Coldstart
    GoTo MAIN_LOOP
Endif Call Check_Defrost          -- Defrost Scheduling: Appendix 3

-- Once per sample time computations:

If (time - last_sample_time) < SampleTime   GoTo MAIN_LOOP
last_sample_time = time If (state=DEFROST .OR. state=POSTDEFROST .OR. state=CYCLEOFF)
    errorsum = 0
    delta_old = 0               -- reset PID accumulators
Endif If state = DEFROST
    -- check to see if primary defrost should be terminated
    If Temp_enabled
        tflag = measured_temp ≥ Termination_Temperature
    Else
        tflag = .F.
    Endif If  ( elapsed_time ≥ Defrost_Max_Duration
        .OR. suction_pressure ≥ Termination_Pressure
        .OR. tflag )
        turn off primary defrost
        state = POSTDEFROST
        last_hz = Design_Hz
        Output(last_hz)        -- turns on motor at full speed
        If auxiliary defrost is on
            turn off auxiliary defrost
        Endif
```

```
            elapsed_time = 0
            errorsum = 0           -- initialize PID
            delta_old = 0
            GoTo MAIN_LOOP         -- and then Exit
       Endif
Endif If state=POSTDEFROST .AND. elapsed_time>Min_PostDefrost_Time
      If Temp_enabled
         tflag = measured_temp ≤ Setpt_Temp + Delta_Pulldown_T
      Else
         tflat = .F.
      Endif If ( suction_pressure ≤ Setpt_Sp + Delta_Pulldown_P
           .OR. elapsed_time ≥ Max_PostDefrost_Time
           .OR. tflag)
            state = RESCTL
      Else
            GoTo MAIN_LOOP       -- Exit if still in PostDefrost
      Endif
Else
      GoTo MAIN_LOOP             -- Exit if still in PostDefrost
Endif If state=CYCLEOFF .AND. elapsed_time > Min_Time_Off If temp_enabled
      cflag = |measured_temp - setpt_temp| ≥ Cycle_Temp_Delta
      Else
           cflag = .F.
      Endif If ( cflag .OR. suction_pressure > Setpt_Sp + Cutin
             .OR. elapsed_time ≥ Max_Time_Off )
           state = CYCLEON
           errorsum = 0                     -- reset PID
           old_delta = 0
```

```
            last_hz = Cycleon_Speed        -- turn on motor at
            Output(last_hz)                -- intermediate speed
            elapsed_time = 0
        Else
            GoTo MAIN_LOOP        -- Exit if still in CYCLEOFF
        Endif
    Endif
Endif -- Calculate new motor speed unless motor is off
-- (i.e., state = DEFROST or CYCLEOFF)
-- or system is in a state in which it must run at a
-- specified speed (i.e., state = POSTDEFROST)

CALL PID              -- see Appendix 5

-- Override PID determined motor speed
-- if Temperature or Pressure is too high or too low If ( ( Temp_Enabled .AND. measured_temp ≥ Case_Temp_Max )
     .OR. suction_pressure > Setpt + Delta_High )
     last_hz   = Design_Hz
     state     = MAXSPEED
     errorsum  = 0                    -- reset PID
     delta_old = 0
Endif If ( ( Temp_Enabled .AND. measured_temp ≤ Case_Temp_Min )
     .OR. suction_pressure < Setpt_Sp - Delta_Cutout )
     last_hz   = Min_Speed
     If state ≠ MINSPEED
         state = MINSPEED
         elapsed_time = 0
     Endif
     errorsum  = 0                    -- reset PID
     delta_old = 0
Endif Output (last_hz)
```

```
If state = MINSPEED
    If Temp_Enabled
        tflag =  Setpt_Temp - measured_temp ≥ Deadband_T
    Else
        tflag = .F.
    Endif clfag = Setpt_Sp - suction_pressure ≥ Deadband_P If .NOT. (tflag .OR. clfag)  elapsed_time = 0

If ( suction_pressure < Setpt_sp - Delta_Low .OR.
        elapsed_time ≥ Min_Speed_Time  )
        state = CYCLEOFF
        elapsed_time = 0
        last_hz = 0              -- shutdown motor
        Output (last_hz)
    Endif
Endif Update Display of Status
GoTo MAIN_LOOP
```

APPENDIX 2

PSEUDOCODE for CHECK_ALARM Subroutine

```
If discharge_pressure > discharge_max    -- check discharge
    hp_cnt = hp_cnt + 1                  -- pressure
    If hp_cnt = 1  ErrorLog (Discharge Pressure High)
    If hp_cnt > hp_max
        high_pressure_alarm = .T.
        ErrorLog (Discharge Pressure Fault)
    Endif
Else
    hp_cnt = 0
    high_pressure_alarm = .F.
Endif
```

```
If suction_pressure < suction_min        -- check suction
    sp_cnt = sp_cnt + 1                  -- pressure
    If sp_cnt = 1  ErrorLog (Suction Pressure Low)
    If sp_cnt > sp_max
        low_pressure_alarm = .T.
        ErrorLog (Suction Pressure Fault)
    Endif
Else
    sp_cnt = 0
    low_pressure_alarm = .F.
Endif oil_alarm = Input(compressor motor oil problem)
If oil_alarm  ErrorLog (Oil Fault)

inverter_alarm = Input(inverter alarm signal)
If inverter_alarm  ErrorLog (Inverter Fault)

-- check for motor speed feedback discrepancy
If last_hz ≠ 0
  If |motor_speed - last_hz| / last_hz > 0.15
    ms_cnt = ms_cnt + 1
    If hp_cnt = 1  ErrorLog (Motor Speed Discrepancy)
    If ms_cnt > ms_max
        motor_speed_sensor_alarm = .T.
        ErrorLog (Motor Speed Discrepancy Fault)
    Endif
  Else
    ms_cnt = 0
    motor_speed_sensor_alarm = .F.
  Endif
Endif If Temp_Enabled                    -- check temp if enabled
    If ( temperature ≥ case_temp_min .AND.
        temperature ≤ case_temp_max   )
        temp_fault = .F.
        temp_cnt   = 0
    Else                                   -- temp out of range
```

```
            temp_cnt = temp_cnt + 1
            If temp_cnt = 1  ErrorLog (Temp Out Of Range)
            If temp_cnt > temp_cnt_max
                If .NOT. temp_fault  ErrorLog(Temp Fault)
                temp_fault = .T.
            Endif
        Endif
Endif If   (   high_pressure_alarm
    .OR. low_pressure_alarm
    .OR. oil_alarm
    .OR. inverter_alarm
    .OR. motor_speed_sensor_alarm
    .OR. temp_fault                )
    mode = MECHANICAL              -- turn on Mechanical backup
    elasped_time = 0
Endif If mode   = MECHANICAL             -- in mechanical mode
    sstate = 0                     -- prepare for auto restart
    state = COLDSTART
    last_hz = 0                    -- make sure only mechanical
    Output (last_hz)               -- backup controls motor
    If (primary defrost is on)     turn off primary defrost
    If (auxiliary defrost is on)   turn off auxiliary defrost
    Return
Endif
```

APPENDIX 3

PSEUDOCODE for "CHECK_DEFROST": Defrost Scheduling Subroutine

If (defrost scheduling is not enabled) Return

Set defrost_start_time = next scheduled primary defrost

If time = defrost_start_time
    state = DEFROST

```
            last_hz = 0                -- shutdown motor
            Output (last_hz)
            turn on primary defrost
            elapsed_time = 0
            If aux_defrost_exists  turn on auxiliary defrost
            Return
    Endif If (auxiliary defrost scheduling is enabled)
            Set aux_defrost_start_time
                = next scheduled auxiliary defrost
            If time = aux_defrost_start_time
                 turn on auxiliary defrost
                 aux_defrost_off_time = time + Aux_Defrost_Duration
                    --   leave motor on
            Endif If (auxiliary defrost is on)
                If time = aux_defrost_off_time
                    turn off auxiliary defrost
                Endif
            Endif
    Endif
    Return
```

APPENDIX 4

Pseudocode for Analog Signal Input Interrupt Routine

```
-- Interrupt occurs 120 times per seconds - at peaks and
-- valleys of 60 hertz power line signal -- Read in and update running averages of temperature,
-- suction and discharge pressure, and motor speed feedback.

If (ICNT > 16 .OR. ICNT < 1) ICNT = 1

BEGIN CASE (ICNT)
```

```
CASE ICNT=1                                    -- PEAKS
     T0 = ADC INPUT
     SET ADC TO READ S_PRESSURE

CASE ICNT=3
     S0 = ADC INPUT
     SET ADC TO READ D_PRESSURE

CASE ICNT=5
     D0 = ADC INPUT
     SET ADC TO READ MOTOR_SPEED

CASE ICNT=7
     M0 = ADC INPUT
     SET ADC TO READ TEMPERATURE

CASE ICNT=10                                   -- VALLEYS
     T0 = (T0 + ADC INPUT)/2
     T3 = T2; T2 = T1; T1 = T0
     measured_temp = (T3 + T2 + T1) / 3
     SET ADC TO READ S_PRESSURE CASE ICNT=12
     S0 = (S0 + ADC INPUT0/2
     S8 = S7; S7 = S6; S6 = S5; S5 = S4
     S4 = S3; S3 = S2; S2 = S1; S1 = S0
     suction_pressure = (S8+S7+S6+S5+S4+S3+S2+S1) / 8
     SET ADC TO READ D_PRESSURE CASE ICNT=14
     D0 = (D0 + ADC INPUT)/2
     D8 = D7; D7 = D6; D6 = D5; D5 = D4
     D4 = D3; D3 = D2; D2 = D1; D1 = D0
     discharge_pressure = (D8+D7+D6+D5+D4+D3+D2+D1) / 8
     SET ADC TO READ MOTOR_SPEED

CASE ICNT=16
     M0 = (M0 + ADC INPUT)/2
```

```
M8 = M7; M7 = M6; M6 = M5; M5 = M4
M4 = M3; M3 = M2; M2 = M1; M1 = M0
motor_speed = (M8+M7+M6+M5+M4+M3+M2+M1) / 8
SET ADC TO READ TEMPERATURE
```

ENDCASE

ICNT = ICNT + 1 elapsed_time = elapsed_time + $\frac{1}{120}$ seconds

RETURN

APPENDIX 5

PSEUDOCODE FOR PID ROUTINE

-- This is done once every SampleTime seconds

If (UsePressure .OR. .NOT. Temp_Enabled) Goto P_PID

-- <u>TEMPERATURE CONTROL METHOD</u>

```
-- Integrate temperature
    errorsum = errorsum +
    ((( SampleTime * (delta_temp + delta_old) /
      (temp_range * 2))

-- Differentiate temperature
    delta_temp = measured_temp - setpt_temp tempd =  (delta_temp - delta_old) /
                (temp_range * SampleTime)

delta_old = delta_temp
```

```
-- PID total                              Typical Values
    err =  (Kp * Ki * errorsum)            -- Kp = 0.6
         + (Kp * Kd * tempd)               -- Kd = 0.15
```

```
              + (Kp * delta_temp/temp_range)      -- Ki = 0.10
                                                  -- temp.range =
     speed_change = err * range_hz_max            -- 70 to 110

-- Check for Stable Temperature
If |measured_temp - Setpt_Temp| ≤ Deadband_T
     state = STABLE
     Goto CHECK
Endif
Goto SLOW

-- PRESSURE CONTROL METHOD

P_PID:

If Temp_Enabled   Call DoFloat              -- float pressure setpt
                                            -- See Appendix 8

-- Integrate suction pressure
     errorsum = errorsum +
     ((( SampleTime * (delta_sp + delta_old) /
       (Sp_Range * 2))

-- Differentiate suction pressure
     delta_sp = suction_pressure - Setpt_Sp spd = (delta_sp - delta_old) /
                 (Sp_Range * SampleTime)

delta_old = delta_sp

-- PID total                                     Typical Values
     err = (Kp * Ki * errorsum)                  -- Kp = 0.46
         + (Kp * Kd * spd)                       -- Kd = 0.21
         + (Kp * delta_temp/Sp_Range)            -- Ki = 0.10
                                                 -- Sp_Range =
     speed_change = err * range_hz_max           -- 70 to 110

-- Check for Stable Suction Pressure
```

```
If |suction_pressure - Setpt_Sp| ≤ Deadband_P
     state = STABLE
     Goto CHECK
Endif -- Check for slow down of motor SLOW:
If speed_change < 0
     If  |speed_change| > Slowdown_Rate
          speed_change = Slowdown_Rate
     Endif state = SLOWER
     new_hz = last_hz + speed_change If new_hz < Min_Speed
          ErrorLog (ER_MIN_HZ_MOTOR)
          new_hz = Min_Speed
     Endif
     Goto CHECK
Endif -- Check for Speedup of motor
If speed_change > 0
     If speed_change > Speedup_Rate
          speed_change = Speedup_Rate
     Endif state = FASTER
     new_hz = last_hz + speed_change If new_hz > Design_Hz
          ErrorLog(ER_MAX_HZ_MOTOR)
          new_hz = Design_Hz
     Endif
Endif

CHECK:
```

```
If new_hz ≥ Design_Hz   state = MAXSPEED
If new_hz ≤ Min_Speed .AND. state ≠ MINSPEED
    state = MINSPEED
    elapsed_time = 0
Endif last_hz = new_hz
Return
```

APPENDIX 6

PSEUDOCODE FOR COLDSTART Routine

```
BEGIN CASE (sstate)

CASE (sstate = 0)

If primary defrost is on
      If ( elapsed_time ≥ Defrost_Max_Duration
         .OR. suction_pressure ≥ Termination_Pressure)
         turn off primary defrost
         If auxiliary defrost is On
              turn off auxiliary defrost
         Endif
      Else
         Return                         -- Wait until Defrost is
      Endif                              -- done
    Endif last_hz = Cyclon_speed
    Output (last_hz)
    elapsed_time = 0 sstate = 1
    If Temp_Enabled    tt = measured_temp
    pp = suction_pressure
    dd = discharge_pressure Return
```

```
CASE (sstate = 1)    -- let motor ramp up for a few minutes

If elapsed_time > 1 minute .AND. elapsed_time < Rampup
        If motor_speed < MinSpeed * elapsed_time/Rampup
            ErrorLog ("Motor not ramping up")
        Endif
        Return
    Endif If  | last_hz - motor_speed |  > Max_Speed_Dif
        last_hz = 0                -- shutdown motor
        Output (last_hz)
        sstate = 0
        mode = MECHANICAL          -- activate mechanical
        Return                     -- backup and exit
    Endif sstate = 2
    elapsed_time = 0
    Return CASE (sstate = 2)

If elapsed_time > Rampup2      -- typically 3 mins
        state = NULLSTATE          -- go back to steady state
                                   -- control
        Call Init.PID              -- see Appendix 7
        Return
    Endif If Temp_Enabled
        If tt - measured_temp < Min_Tchange
            ErrorLog ("Temperature not ramping down")
        Endif
    Endif
    If pp - suction_pressure < Min_Pchange
        ErrorLog ("Suction Pressure not ramping down")
    Endif
```

```
    If discharge_pressure - dd < Min_Dchange
        ErrorLog ("Discharge Pressure not ramping up")
    Endif Return

ENDCASE

Return
```

APPENDIX 7

PSEUDOCODE FOR INIT.PID ROUTINE

```
If Temp_Enabled
    Kp       = 0.6
    Ki       = 0.15
    Kd       = 0.10
Else
    Kp       = 0.46
    Ki       = 0.218
    Kd       = 0.10
Endif speed_change   = 0
errorsum       = 0
tempd          = 0
delta.old      = 0
new_hz         = 0
last_hz        = 0
```

APPENDIX 8

PSEUDOCODE FOR DOFLOAT ROUTINE

```
-- Float the target pressure periodically (typically once
-- every few minutes)

If time < time_last_float + delta_tf  Return
```

```
time_last_float = time

-- If temperature is above its setpoint deadband
-- decrease suction pressure setpoint, but not below psi_min If measured_temp > Setpt_temp + Deadband_T
    If Setpt_sp > psi_min
        Setpt_sp = Setpt_sp - 1
    Endif
    Return
Endif -- If temperature is below its setpoint deadband
-- increase suction pressure setpoint, but not above psi_max If measured_temp < Setpt_temp - Deadband_T
    If Setpt_sp < psi_max
        Setpt_sp = Setpt_sp + 1
    Endif
    Return
Endif Return
```

What is claimed is:

1. A single stage compressor system for use in a refrigeration system having one or more refrigerator cases wherein goods are stored said refrigeration system including condensing means for condensing compressed refrigerant from said compressor system, evaporating means for expanding the refrigerant in said condensing means and thereby removing heat from said refrigerator cases, and compressor suction line means for directing expanded refrigerant from said evaporating means to said compressor system, said compressor system comprising:
   a reciprocating compressor coupled to a three phase drive motor in an open direct drive arrangement, said motor having a capacity of at least five horsepower;
   inverter means for driving said motor at a speed specified by a motor speed signal, wherein said speed can be varied substantially continuously over a predefined range of speeds;
   load sensing means for detecting at least one physical parameter indicative of the load on the refrigeration system selected from the set consisting of the temperature in at least one of said refrigerator cases, and the pressure in said compressor suction line means, and for generating a load differential signal corresponding to the difference between said detected physical parameter and a specified target value;
   control means, responsive to said load differential signal, for adjusting the capacity of the refrigeration system by adjusting the speed of said motor within said predefined range of speeds, including software means for establishing an initial speed value and for periodically adjusting said speed value so as to minimize said load differential signal, and means for generating a motor speed signal corresponding to said speed value;
   wherein said control means adjusts the capacity of said refrigeration system within a substantially continuous range.

2. The compressor system of claim 1, wherein the ratio of the minimum and maximum speeds in said predefined range of speeds is at least 1:2.

3. The compressor system of claim 1, wherein
   said compressor is supported at a fixed location and has a housing and an input shaft;
   said motor has a housing and a drive shaft; and
   said compressor system further includes:
   a coupling arrangement including a first coupling member carried by the output shaft of said motor, and a second coupling member carried by the input shaft of said compressor, said coupling members being interlocked in an unconnected manner with one another so that the output shaft of said motor drives the input shaft of said compressor; and an alignment arrangement disengageably connected to said compressor and said motor, said alignment arrangement supporting said motor in a position relative to said compressor for maintaining the output shaft of said motor in alignment with the input shaft of said compressor when said coupling members are interlocked with one another;

wherein said alignment arrangement consists essentially of a sleeve dissengageably connected to said compressor housing and said motor housing, and said alignment arrangement is the sole means for supporting said motor so as to maintain said shafts in alignment with one another.

4. The compressor system of claim 1, wherein
said load sensing means includes means for sensing the temperature in at least one of the refrigeration cases in the refrigeration system; and
said software means includes temperature strategy means for adjusting said speed value by an amount proportional to the lesser of a predefined speed adjustment limit, and $$(Kd*d\Delta T/dt)+(Ki\int \Delta dt)+\Delta T$$

where $\Delta T$ is the difference between the temperature in said preselected area and a specified target temperature, Kd and Ki are constant parameters, $d\Delta T/dt$ is the rate of change in $\Delta T$ and "$\int \Delta T\, dt$" is the integral of $\Delta T$ over a specified period of time.

5. The compressor system of claim 4, wherein said strategy means includes means for keeping said speed value constant when said speed adjustment amount is less than a predefined deadband value.

6. The compressor system of claim 1 wherein
said load sensing means includes pressure sensing means for sensing the pressure in said compressor suction line; and
said software means includes pressure strategy means for periodically adjusting said speed value by an amount proportional to the lesser of a predefined speed adjustment limit, and $$(Kd*d\Delta P/dt)+(Ki\int \Delta Pdt)+\Delta P$$

where $\Delta P$ is the difference between the pressure in said suction line and a specified target pressure, Kd and Ki are constant parameters, $d\Delta P/dt$ is the rate of change in $\Delta P$ and "$\int \Delta P\, dt$" is the integral of $\Delta P$ over a specified period of time.

7. The compressor system of claim 6, wherein said pressure strategy means includes means for periodically floating said target pressure, including:
means for increasing said target pressure if said temperature is lower than a specified target temperature; and
means for decreasing said target pressure if said temperature is higher than said specified target temperature.

8. The compressor system of claim 6, wherein said strategy means includes means for keeping said speed value constant when said speed adjustment amount is less than a predefined deadband value.

9. A method of controlling the capacity of a single stage compressor system for use in a refrigeration system having one or more refrigerator cases wherein goods are stored, said refrigeration system including condensing means for condensing compressed refrigerant from said compressor system, evaporating means for expanding the refrigerant in said condensing means and thereby removing heat from said refrigerator cases, and compressor suction line means for directing expanded refrigerant from said evaporating means to said compressor system, the steps of the method comprising:

providing a reciprocating compressor coupled to a three phase drive motor in an open direct drive arrangement, said motor having a capacity of at least five horsepower, and inverter means for driving said motor at a speed specified by a motor speed signal, wherein said speed can be varied substantially continuously over a predefined range of speeds;

detecting at least one physical parameter indicative of the load on the refrigeration system selected from the set consisting of the temperature in at least one of said refrigerator cases, and the pressure in said compressor suction line;

generating an error signal $\Delta S$ corresponding to the difference between said detected physical parameter and a specified target value; and periodically adjusting the capacity of the refrigeration system by adjusting the speed of said motor within said predefined range of speeds, including the steps of establishing an initial speed value, periodically adjusting said speed value so as to minimize said error signal, and generating a motor speed signal corresponding to said speed value;

wherein the capacity of said refrigeration system is automatically adjusted within a substantially continuous range so as to match the load on said refrigeration system.

10. The method of claim 9, wherein
said adjusting step includes the step of adjusting said speed value by a amount proportional to the lesser of a predefined speed adjustment limit, and $$(Kd*d\Delta S/dt)+(Ki\int \Delta Sdt)+\Delta S$$

where Kd and Ki are constant parameters, $d\Delta S/dt$ is the rate of change in $\Delta S$ and "$\int \Delta S\, dt$" is the integral of $\Delta S$ over a specified period of time.

11. The method of claim 10, wherein said adjusting step includes keeping said speed value constant when said speed adjustment amount is less than a predefined deadband value.

* * * * *